(12) United States Patent
Wilhelm

(10) Patent No.: US 8,364,296 B2
(45) Date of Patent: Jan. 29, 2013

(54) METHOD AND SYSTEM FOR SYNCHRONIZING PLAYING OF AN ORDERED LIST OF AUDITORY CONTENT ON MULTIPLE PLAYBACK DEVICES

(75) Inventor: Robert D. Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 1429 days.

(21) Appl. No.: 11/968,432

(22) Filed: Jan. 2, 2008

(65) Prior Publication Data

US 2009/0171487 A1    Jul. 2, 2009

(51) Int. Cl.
*G06F 17/00* (2006.01)
*H04N 7/18* (2006.01)
*H04B 7/00* (2006.01)

(52) U.S. Cl. ............................ 700/94; 725/80; 455/502
(58) Field of Classification Search .................... 700/94; 709/209, 230–234; 715/727; 725/78, 80; 710/15, 19; 455/3.06, 502, 503, 507, 66.1, 455/70

See application file for complete search history.

(56) References Cited

U.S. PATENT DOCUMENTS

| | | | | |
|---|---|---|---|---|
| 6,907,458 | B2 * | 6/2005 | Tomassetti et al. | 709/223 |
| 2004/0252400 | A1 * | 12/2004 | Blank et al. | 360/70 |
| 2005/0160270 | A1 * | 7/2005 | Goldberg et al. | 713/176 |
| 2005/0289224 | A1 * | 12/2005 | Deslippe et al. | 709/208 |
| 2009/0094376 | A1 * | 4/2009 | Kosiba | 709/231 |

OTHER PUBLICATIONS

Frakes, D., Review: Sonos Digital Music System, Sep. 2, 2007, http://www.sonos.com.
Amazon.com: Roku Soundbridge R1000 Radio Network Music System, Sep. 2, 2007, http://www.rokulabs.com/products_soundbridge.php.
AirPort Express with AirTunes, Sep. 2, 2007, http://www.apple.com/airportexpress/.

* cited by examiner

*Primary Examiner* — Jesse Elbin
(74) *Attorney, Agent, or Firm* — Arthur J. Sanodovitz

(57) ABSTRACT

A method, system and program product for synchronizing playing of a playlist on multiple audio devices. The method includes installing code on multiple audio devices connected to a network, the code being configured to synchronize playing of a playlist on the devices, and configuring, using the code, one device as a primary device for synchronizing playing of the files in the playlist on the other devices located in multiple locations. Further, the method includes communicating data corresponding to a current state of the primary device to each secondary device that is to play the playlist in synchronization with the primary device, synchronizing, using data communicated by the primary device, a current state of the secondary device that is to play the file, and playing the playlist on the secondary device, such that the secondary device plays the playlist at a same time in synchronization with the primary device.

3 Claims, 15 Drawing Sheets

METHOD AND SYSTEM FOR SYNCHRONIZING PLAYING OF AN ORDERED LIST OF AUDITORY CONTENT ON MULTIPLE PLAYBACK DEVICES

FIELD OF THE INVENTION

The present invention relates to computer systems and software, and more specifically to an automated technique for synchronizing playing of an ordered list of auditory content, such as, a music playlist, on multiple playback devices in multiple locations.

BACKGROUND OF THE INVENTION

As wireless technology becomes more prevalent in the marketplace, product manufacturers are creating audio players that use the wireless technology to play digital music. Increasingly, consumers are interested in purchasing audio players that can not only play digital music wirelessly, but can also do so throughout an entire area, such as, an office or a house, etc. As such, audio equipment manufacturers require innovative ways to create audio products that fit different consumer lifestyles and products and that are affordable to consumers.

SUMMARY OF THE INVENTION

The present invention resides in a method, system and program product for synchronizing playing of an ordered list of auditory content on one or more audio playback devices. The method includes installing code on each of one or more audio playback devices connected to a network, the code being configured to synchronize playing of files in an ordered list of auditory content on the one or more audio playback devices located in multiple locations, and configuring, using the code, one device of the one or more audio playback devices as a primary device for synchronizing playing of the files in an ordered list of auditory content on the one or more audio playback devices located in the multiple locations. Further, the method includes communicating data corresponding to a current state of the primary device to each secondary device of the one or more audio playback devices that is to play a file in an ordered list of auditory content in synchronization with the primary device, the data including a synchronized time stamp, a respective file number corresponding to the file on an ordered list of auditory content and a respective file time referencing a point-in-time mark of the file where the each secondary device is to begin playing the file, synchronizing, using the data communicated by the primary device, a respective current state of the each secondary device of the one or more audio playback devices that is to play the file, and playing the file in an ordered list of auditory content on the each secondary device located in the multiple locations, wherein the each secondary device of the one or more audio playback devices plays the file at a same time in synchronization with the primary device. The method further includes updating, using the code, the data on the primary device at a pre-determined time interval, communicating the data updated to the each secondary device of the one or more audio playback devices in the multiple locations, and adjusting, if necessary, using the code, the respective current state of a respective secondary device of the one or more audio playback devices, based on the data updated and communicated to the respective secondary device, wherein the respective secondary device plays an ordered list of auditory content in synchronization with the primary device. In an embodiment, the configuring step further includes determining whether or not a respective device in a respective location of the multiple locations has been configured to act as a primary device and, if the respective device is determined to be configured to act as a primary device, sending a request by a respective secondary device to the primary device in the respective location for joining in playing of an ordered list of auditory content in synchronization with the primary device. The method further includes configuring a device of the audio playback devices to act as the primary device, if the respective device is determined not to be configured to act as a primary device. In an embodiment, the communicating step further includes communicating an ordered list of auditory content to the each secondary device that is to play the ordered list of auditory content, and determining, using the code, a respective location of a next file in an ordered list of auditory content to be played on the respective secondary player in synchronization with the primary device. In an embodiment, the determining step further includes downloading to the respective secondary player, the next file to be played in synchronization with the one or more audio playback devices, if the next file is not found locally on the respective secondary player, and deleting the next file from the respective secondary player after the respective file has been played on the secondary player. In an embodiment, the determining step further includes streaming to the respective secondary player the next file from either another player of the one or more audio playback devices or an alternative audio playback device for playing the next file in synchronization with the one or more audio playback devices, if the respective file is determined to be in a remote location on the network. In an embodiment, the determining step further includes requesting removal of the next file from an ordered list of auditory content if a quorum of the audio playback devices do not have the next file located locally on the audio playback devices.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
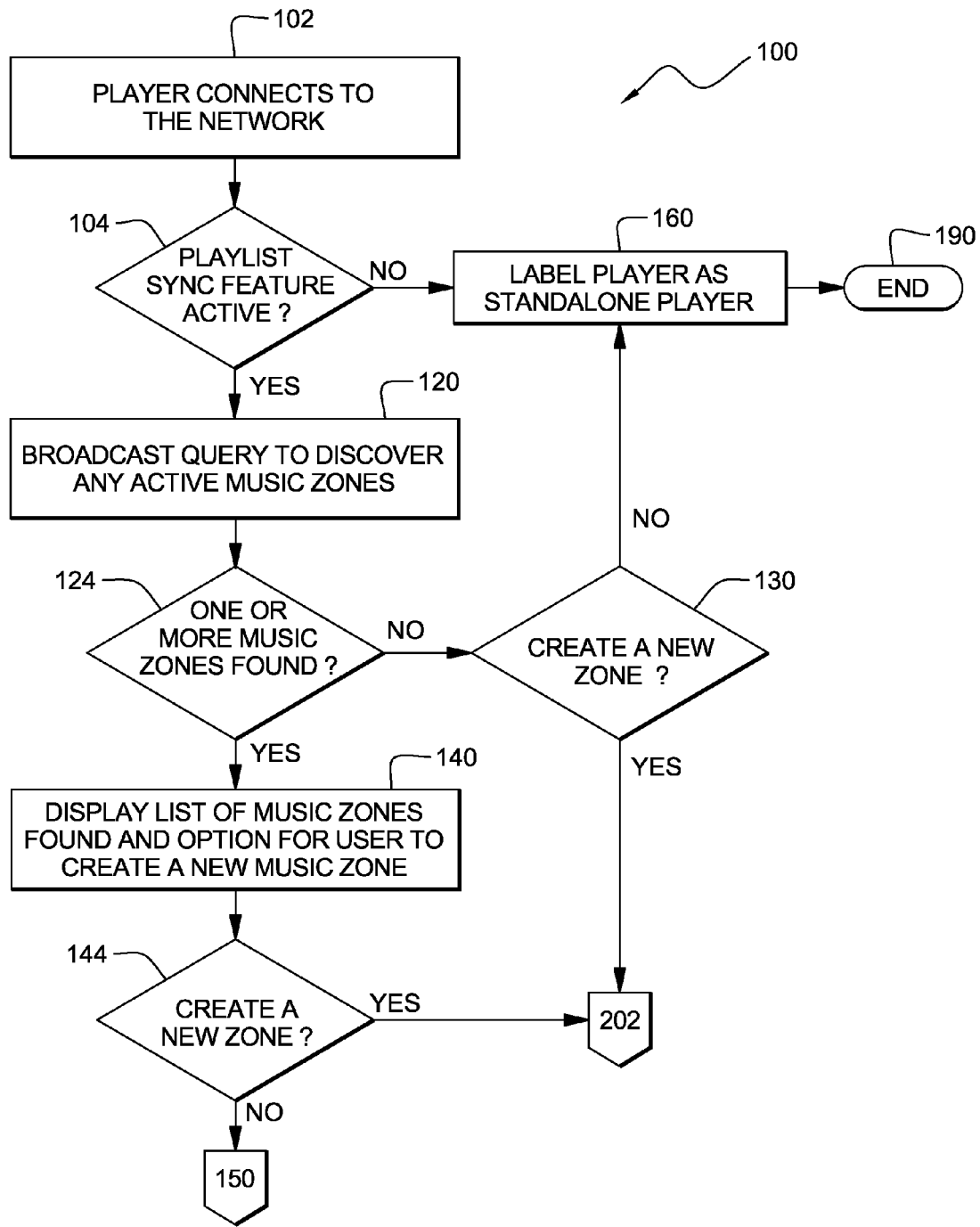
FIGS. 1-11 are flowcharts outlining the method steps for synchronizing playing of an ordered list of auditory content on one or more audio playback devices in multiple locations, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Reference is now made to FIGS. 1 through 11, which together depict a method or process for synchronizing playing of an ordered list of auditory content, such as, an audio clip playlist (containing a plurality of audio clip files) or a music or track playlist (containing a plurality of track or song files), on one or more audio playback devices located in multiple locations and connected to a network, such that, the playlist and the corresponding audible stream are identical between the playback devices. Although, the invention as described herein uses a music or song playlist as an example of auditory content, it is understood that that the method is applicable to other types of auditory content, such as audio clips. In particular, the method utilizes a playlist synchronization tool or code, discussed further herein below, that is installed on each of the audio playback devices that a user chooses for synchronizing playing of auditory content on these devices, which in an embodiment are located in different places or locations or zones. In an embodiment, the playlist synchronization tool is configured to start automatically when the audio playback device is turned on. Turning to FIG. 1, reference numeral 100, the process starts with step 102 of connecting an audio playback device to an existing network by turning the player on. An audio playback device can be any device that is capable of communicating on a wired or wireless network, such as a Wi-Fi (Wireless Fidelity) capable MP3 player (MPEG-1 (Moving Pictures Experts Group), a computer, a PDA (Personal Digital Assistant) or any other playback hardware or software combination which utilizes a playlist in defining an ordered list of auditory content, such as, music tracks or audio clips to play and is also networkable. In an embodiment, the audio playback device (often referred to herein as "player" or "playback device(s)" or "MP3 player") is used in conjunction with speaker docks or other attachable speakers, so that the audio source can be extended to any device within reach of and participating on the network. Further, as shown in FIG. 1, in step 104, the playlist synchronization (sync) tool or code determines whether or not the playlist synchronization feature is active. If the playlist synchronization tool determines that the playlist synchronization feature is not active, then in step 160, the playlist synchronization tool labels the player as a standalone player that will not be playing a playlist in synchronization with other players, ending the process at step 190. However, in step 104, if the playlist synchronization tool determines that the playlist synchronization feature is active, then in step 120 the playlist synchronization tool on the player broadcasts a query over the network to determine whether there is a primary device or player and an audio zone or location (in this case, referred to as a music zone) that is already active. In an embodiment, the primary device or player sets the pace for playing the auditory content, such that, the other audio playback devices (referred to as secondary devices or players) will synchronize playing of an audio playlist to be in synchronization with the primary device. In step 124, the playlist synchronization tool determines whether or not one or more music zones or locations have been found. If no music zones are found, then the playlist synchronization tool determines if a user wishes to create a new zone in step 130, designating itself as the primary device. If the option of creating a new music zone is selected, then the process continues with step 202, as described further herein below with respect to FIG. 3. However, if the option of creating a new music zone is not selected in step 130, then in step 160, the playlist synchronization tool labels the player as a standalone player that will not be playing a playlist in synchronization with other players, ending the process at step 190. Going back to step 124, if a primary device and one or more music zones are discovered or found, then the playlist synchronization tool displays in step 140 a list of the music zones found and displays to the user an option of creating a new music zone or location. Further, the playlist synchronization tool determines whether or not a user wishes to create a new music zone in step 144, and if the user wishes to create a new music zone, the process continues with step 202 in FIG. 3, discussed herein below. However, if in step 144, the playlist synchronization tool determines that the user does not wish to create a new music zone, then the process continues with step 150 in FIG. 2.

Figure 2:
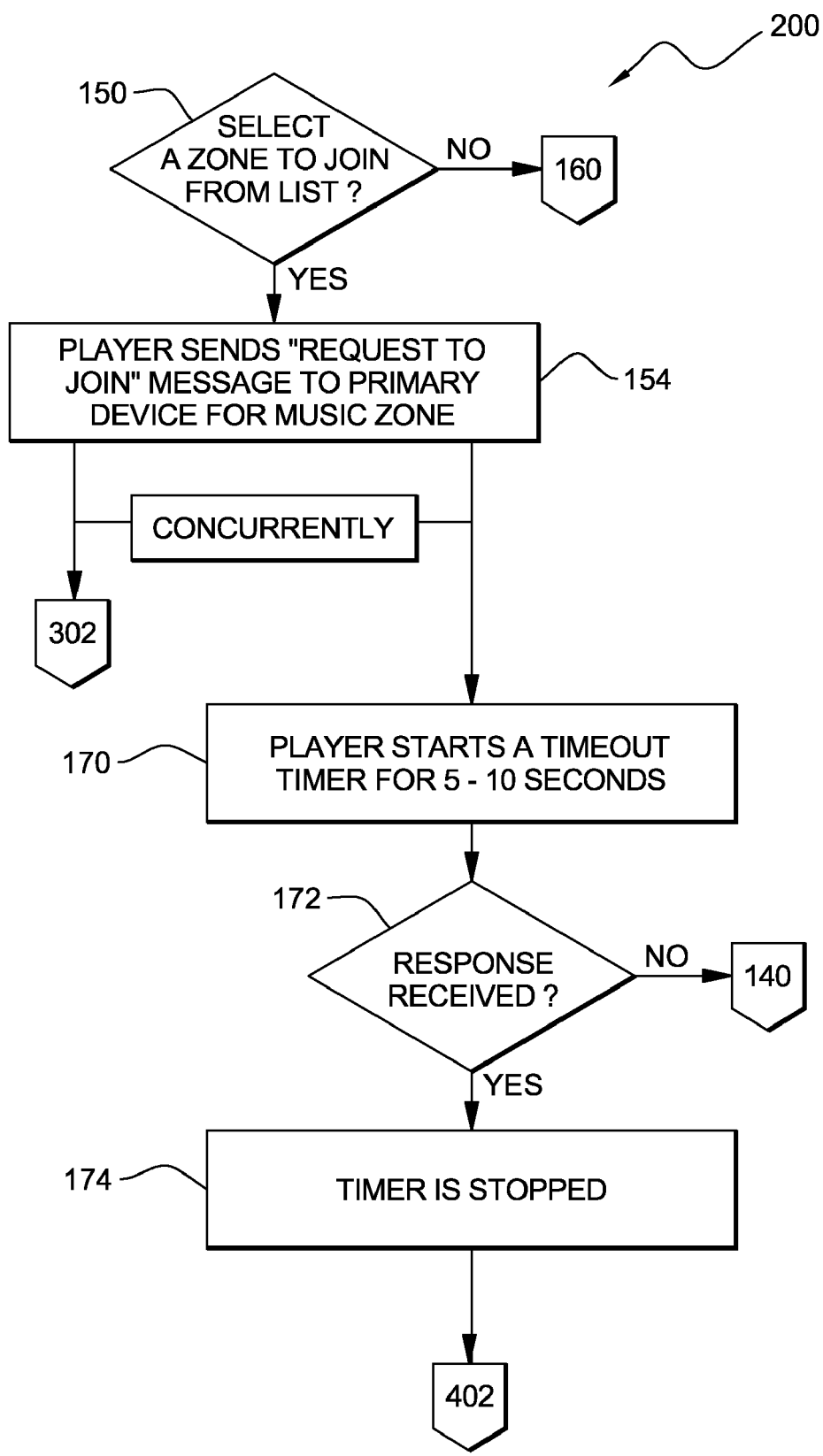

Turning to FIG. 2, reference numeral 200, the playlist synchronization tool determines whether or not the user has selected an audio or music zone to join from the list displayed to the user in step 140. If the user does not select any of the music zones from the displayed list, then the process continues with step 160 in FIG. 1, discussed herein above, where the playlist synchronization tool labels the player as a standalone player, ending the process at 190. However, in step 150 of FIG. 2, if the playlist synchronization tool determines that the user has selected a music zone to join from the displayed list, that is, to join the music zone as a secondary device or player, then the playlist synchronization tool on the player in step 154 sends a request to join message from the secondary device (the current player) to the primary device or player for the music zone selected. Although, the process continues with step 302 in FIG. 5, the playlist synchronization tool also starts or initiates concurrently in step 170 a timeout timer on the secondary device or player, where the timer is set for about 5 to 10 seconds. Further, in step 172, the playlist synchronization tool determines in step 172 whether or not a response has been received on the secondary device (the player) from the primary device or player. If a response is not received within the 5 to 10 seconds of the timeout timer, then the process continues back at step 140 in FIG. 1, where the playlist synchronization tool displays a list of the music zones found and provides a user the option of creating a new music zone. However, if a response is received within the 5 to 10 seconds of the timeout timer in step 172, then the playlist synchronization tool stops the timer on the secondary player in step 174 and the process continues with step 402 in FIG. 6.

Figure 3:
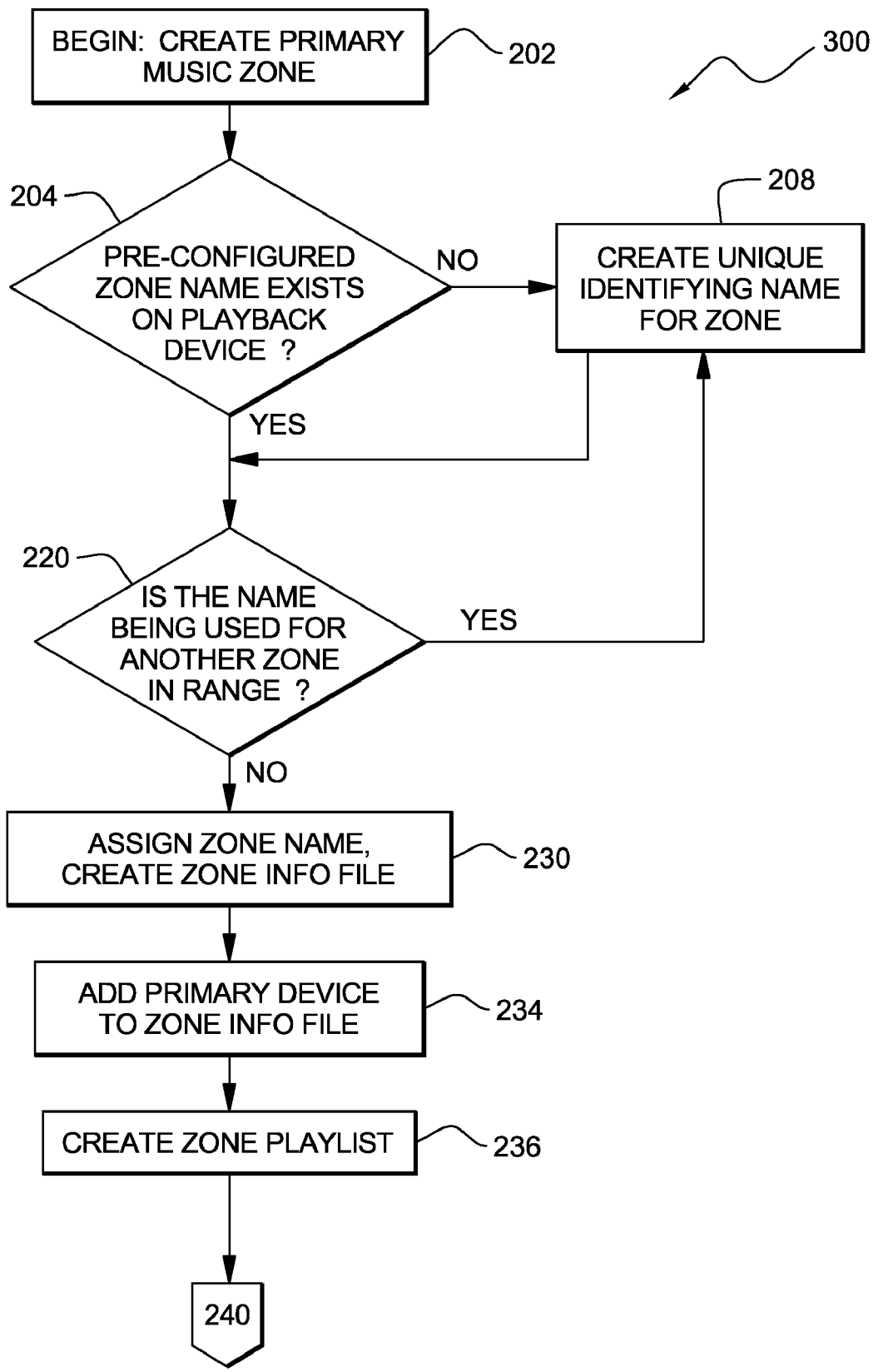
Figure 4:
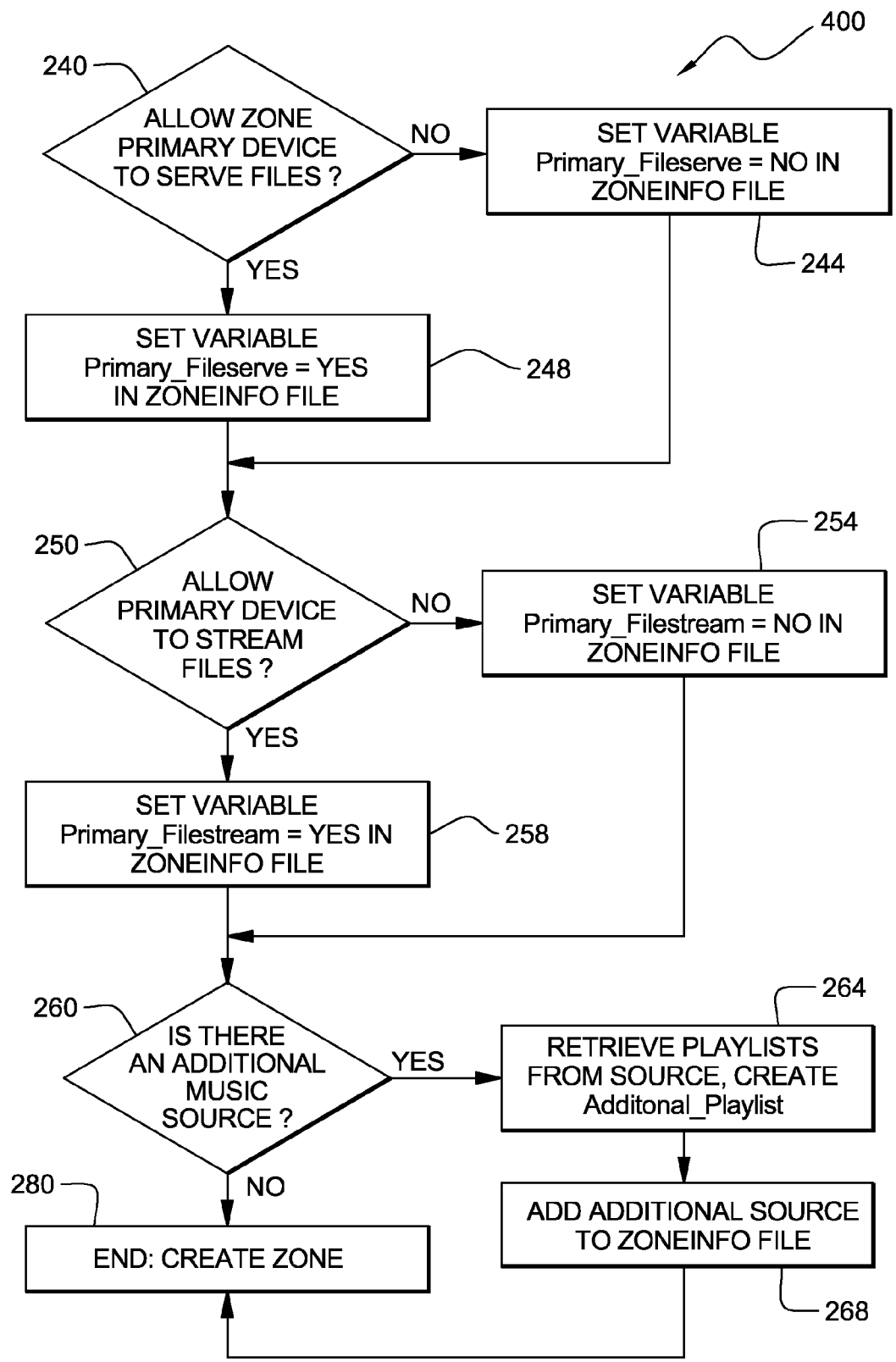

Turning to FIGS. 3 and 4, reference numeral 300 and 400, together outline a method of creating a new primary music or audio zone. The process of creating a new music zone begins in step 202 with the user selecting the option of creating a new music zone in the playlist synchronization tool. In step 204, the playlist synchronization tool determines whether or not a pre-configured zone name exists on the player or audio playback device. If a pre-configured zone name exists on the player, the playlist synchronization tool determines in step 220 whether or not the name is being used for another music zone in the range. However, if a pre-configured zone name does not exist, then the playlist synchronization tool creates in step 208 a unique identifying name for the zone and continues with step 220 by determining whether or not the name is being used for another music zone in the range. If the name is being used for another zone in the range, then the playlist synchronization tool creates a unique identifying name for the zone and again determines in step 220 whether or not the name is being used for another music zone in the range. If the name is not being used for another zone, then in step 230, the playlist synchronization tool assigns a music zone name and creates a zone information (info) file for that music zone. Further, the playlist synchronization tool adds in step 234 the player as a primary device in the zone information file created in step 230. The playlist synchronization tool creates a music zone playlist or playlist for the music zone in step 236 and the process continues with step 240 in FIG. 4. In step 240, of FIG. 4, the playlist synchronization tool determines whether or not to allow the primary device in the music zone created to serve files. If the playlist synchronization tool determines that the primary device is allowed to serve files, then in step 248, the playlist synchronization tool sets an appropriate variable to "yes" in the zone information file, for instance, the variable PRIMARY_FILESERVE is set to YES (PRIMARY_FILESERVE=YES), and the process continues with step 250. However, if the playlist synchronization tool determines that the primary device is not allowed to serve files, then in step 244, the playlist synchronization tool sets the appropriate variable to "no" in the zone information (zoneinfo) file, for instance, the variable PRIMARY_FILESERVE is set to NO (PRIMARY_FILESERVE=NO), and the process continues with step 250. In step 250, the playlist synchronization tool determines whether or not to allow the primary device to stream files to the secondary devices. If the playlist synchronization tool determines that the primary device is allowed to stream files, then in step 258, the playlist synchronization tool sets an appropriate variable to "yes" in the zone information file, for instance, the variable PRIMARY_FILESTREAM is set to YES (PRIMARY_FILESTREAM=YES), and the process continues with step 260. However, if the playlist synchronization tool determines that the primary device is not allowed to stream files, then in step 254, the playlist synchronization tool sets the appropriate variable to "no" in the zone information (zoneinfo) file, for instance, PRIMARY_FILESTREAM is set to NO (PRIMARY_FILESTREAM=NO), and the process continues with step 260. In step 260, the playlist synchronization tool determines whether or not there is any other additional music source, such as, another player or a personal computer. If no additional music source is found in step 260, the process ends at step 280. However, if the playlist synchronization tool finds an additional music source, then the playlist synchronization tool retrieves in step 264 a playlist from the additional source and creates an additional playlist and adds in step 268 the additional source to the zone information file, ending the process at step 280.

Figure 5:
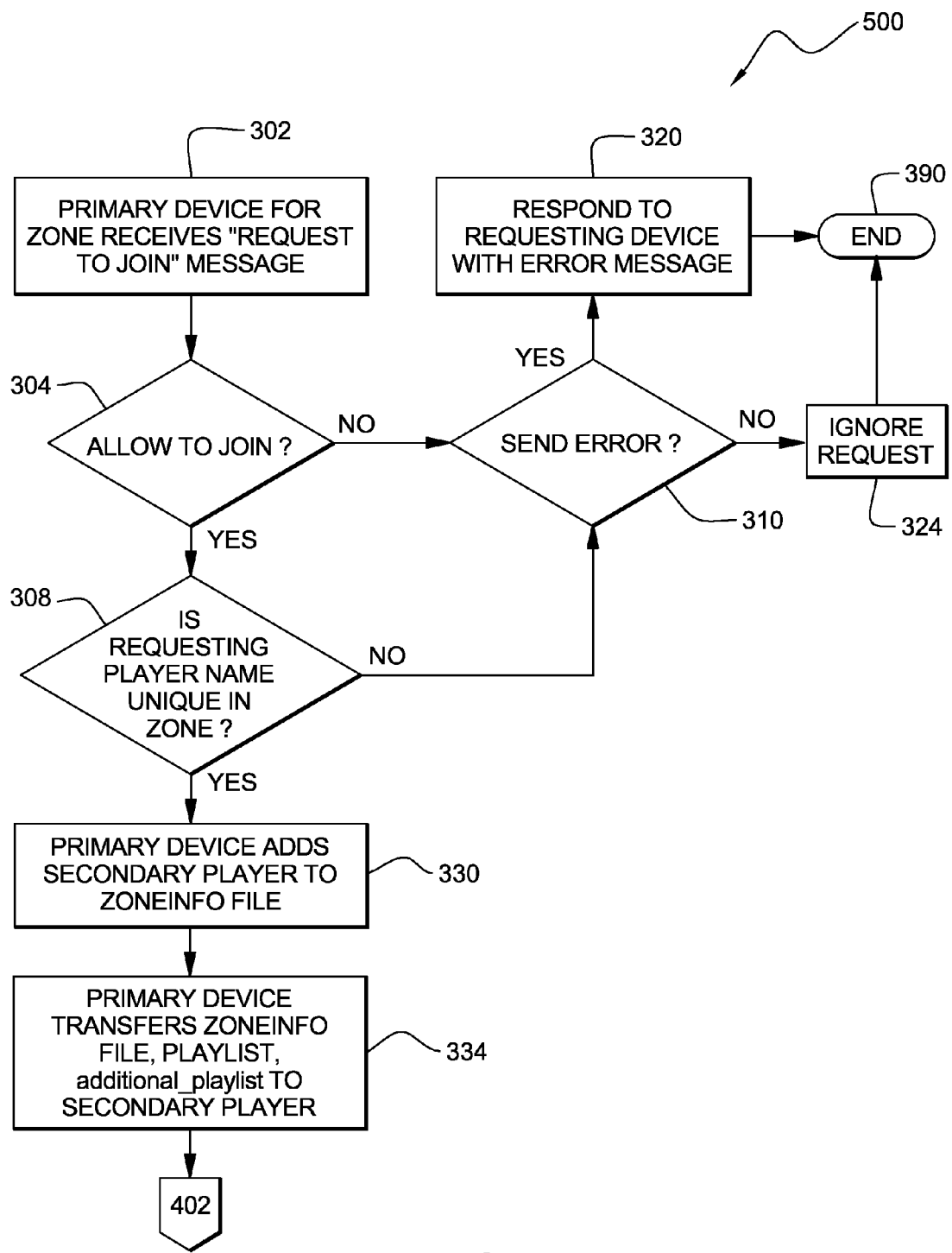

Going back to FIG. 2, after the playlist synchronization tool sends in step 154 a request to join message to the primary device, the process continues with step 302 in FIG. 5. Turning to FIG. 5, reference numeral 500, the playlist synchronization tool on the primary device for the music zone receives the request to join message from the secondary device and determines in step 304 whether or not to allow the secondary device to join. If the playlist synchronization tool on the primary device determines that the secondary device is not allowed to join, then in step 310, the playlist synchronization tool decides whether or not to send an error message to the secondary device. If the playlist synchronization tool decides not to send an error message, then the request to join message is ignored in step 324, ending the process at 390. However, if the playlist synchronization tool decides to send an error message in step 310, then the playlist synchronization tool on the primary device sends in step 320 an error message response to the requesting device, namely, the player that initiated the request, ending the process at 390. On the other hand, if the playlist synchronization tool determines in step 304 that the player should be allowed to join, then the playlist synchronization tool determines in step 308 whether or not the requesting player name is unique in the zone. If the playlist synchronization tool on the primary device determines that the requesting player name is not unique in the zone, then in step 310, the playlist synchronization tool decides whether or not to send an error message to the secondary or requesting device. If the playlist synchronization tool decides not to send an error message, then the request to join message is ignored in step 324, ending the process at 390. If the playlist synchronization tool on the primary device determines that the requesting player name is unique in the zone, then in step 330 the primary device adds the secondary or requesting device or player to the zone information (zoneinfo) file. Further, the primary device transfers in step 334 the zone information (zoneinfo) file, the playlist, and the additional playlist to the secondary device or requesting player and the method continues with step 402 in FIG. 6.

Figure 6:
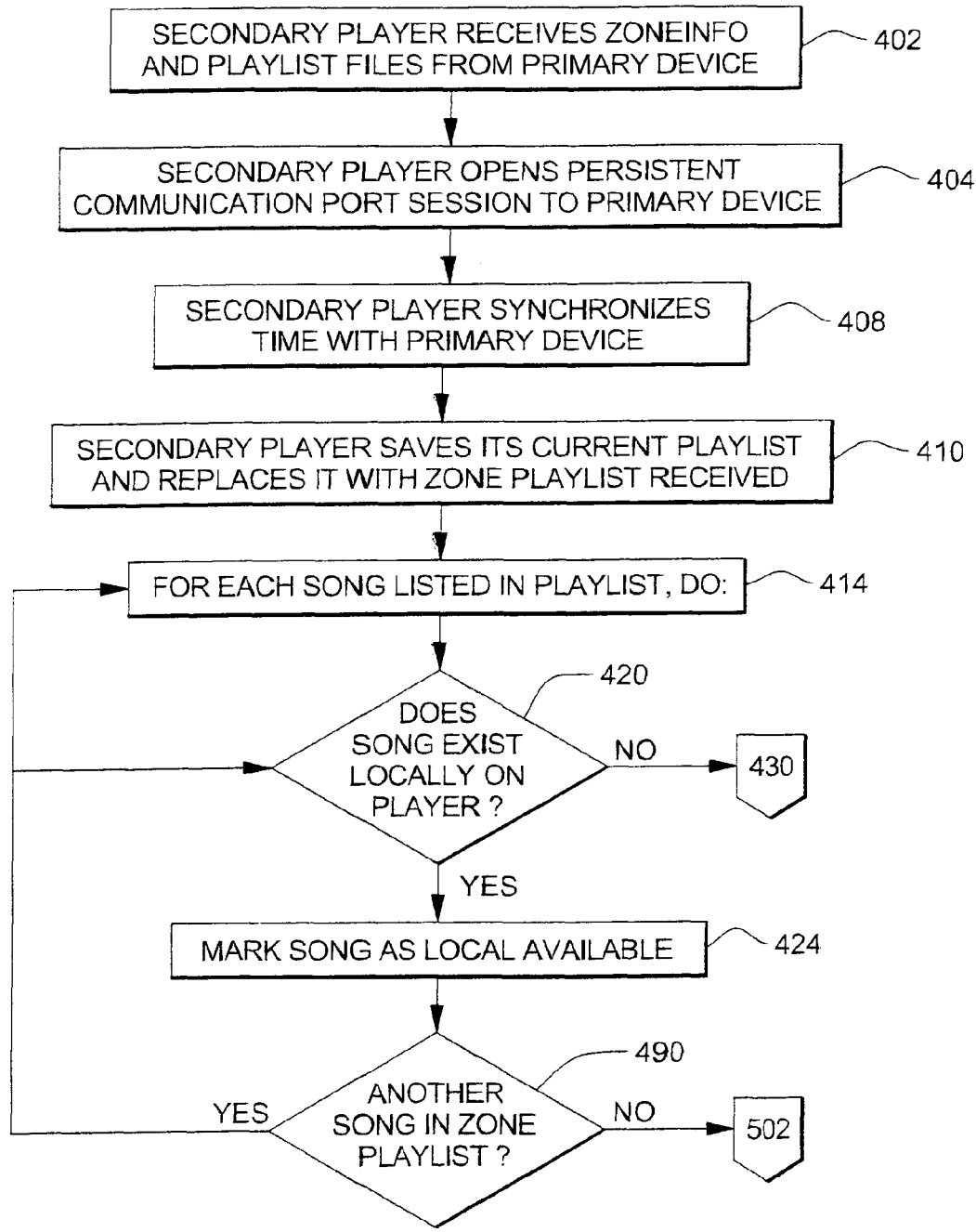

Turning to FIG. 6, the secondary player or device receives in step 402 the zone information (zoneinfo) file and the playlist file from the primary device. In step 404, the secondary device opens a persistent communication port session to the primary device. The secondary device or player synchronizes the time with the primary device in step 408. Further, in step 410, the secondary device saves its current playlist and replaces the current playlist with the zone playlist received from the primary device in step 402. In step 414, the secondary device performs steps 420 through 490 for each song or track or file listed in the playlist received from the primary device. In particular, in step 420, the playlist synchronization tool on the secondary device determines in step 420 whether or not a song or track among the songs or tracks in the playlist exists or is located locally on the secondary device. If the song or track in the playlist is not located locally, then the process continues at step 430 in FIG. 7. However, if the song or track is available locally on the secondary player, then the playlist synchronization tool marks in step 424 the song as "LOCAL", that is, the song is available locally on the secondary device. The playlist synchronization tool determines in step 490 whether or not another there is a second or another song in the playlist. If so, the playlist synchronization tool on the secondary device returns to step 414 and for the second song in the playlist, determines in step 420 whether the second song is located locally on the secondary device. Again, if the second song is not located locally, then the process continues at step 430 in FIG. 7, discussed herein below. However, if the song is available or exists locally, then the playlist synchronization tool marks in step 424 the second song as "LOCAL", that is, the second song is available locally on the secondary device and the process continues with step 490, where the playlist synchronization tool determines whether or not there is another song in the playlist for the music zone. The process steps of 414, 420, 424 and 490 are repeated for each song in the playlist, until the playlist synchronization tool determines in step 490 that there are no more songs in the zone playlist and the process continues at step 502 in FIG. 8.

Figure 7:
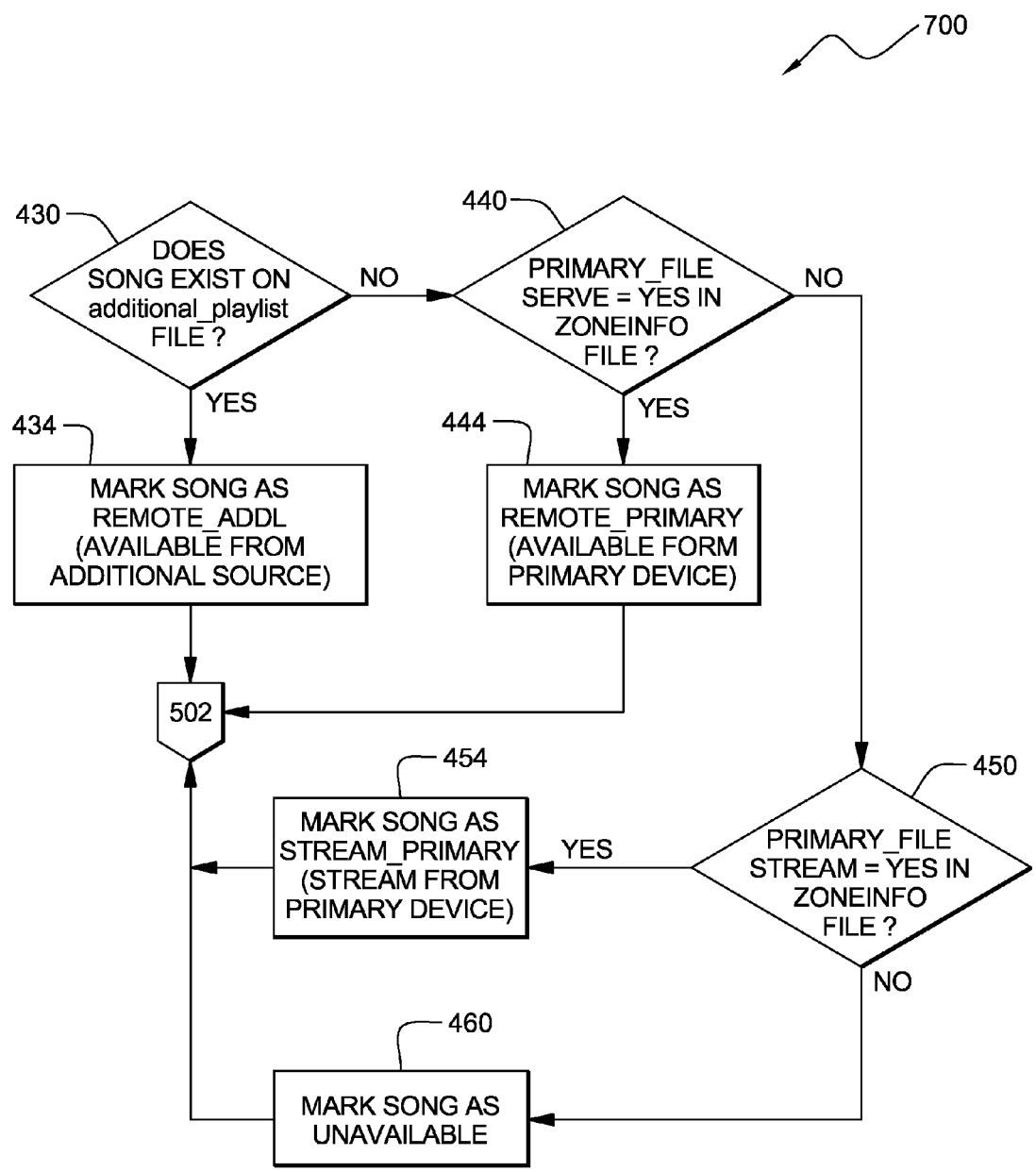

Going back to FIG. 6, if a song or track in the playlist is not located locally on a secondary device, then the playlist synchronization tool continues with the process as outlined in reference numeral 700 of FIG. 7, starting with step 430. Turning to FIG. 7, the playlist synchronization tool determines in step 430 whether or not the song is located in the additional playlist file found on an additional source in FIG. 2. If the playlist synchronization tool determines that the song exists or is located on the additional playlist of an additional source, then in step 434 the playlist synchronization tool marks the song as "REMOTE_ADDL", that is, located on the additional source and the process continues with step 502 in FIG. 8. However, if the playlist synchronization tool determines that the song does not exist or is not located on the additional playlist of the additional source, then the playlist synchronization tool determines in step 440 whether or not the variable PRIMARY_FILESERVE is set to YES (PRIMARY_FILESERVE=YES), that is, the primary device is set to serve a song from the playlist to a secondary device, if needed, as discussed herein above with respect to FIG. 4. If the playlist synchronization tool determines that the variable PRIMARY_FILESERVE is set to YES, then the playlist synchronization tool marks in step 444 the song as REMOTE_ PRIMARY, that is, available from the primary device and the process continues with step 502 in FIG. 8. If the playlist synchronization tool determines that the variable PRIMARY_FILESERVE is set to NO (PRIMARY_FILESERVE=NO), that is, the primary device is not set up to serve a song from the playlist to a secondary device, then the playlist synchronization tool determines in step 450 whether or not variable PRIMARY_FILESTREAM is set to YES (PRIMARY_FILESTREAM=YES), that is, the primary device is set to stream a song from the playlist to a secondary device, if needed, as discussed herein above with respect to FIG. 4. If the playlist synchronization tool determines that the variable PRIMARY_FILESTREAM is set to YES, then the playlist synchronization tool marks in step 454 the song as STREAM_PRIMARY, that is, the primary device can stream the song to the secondary device, and the process continues with step 502 in FIG. 8. However, if in step 450, the playlist synchronization tool determines that the variable PRIMARY_FILESTREAM is set to NO (PRIMARY_FILESTREAM=NO), that is, the primary device is not set up to stream a song from the playlist to a secondary device, then the playlist synchronization tool marks in step 460 the song as UNAVAILABLE, that is, not available from the primary device or from any other additional device and the process continues with step 502 in FIG. 8.

Figure 8:
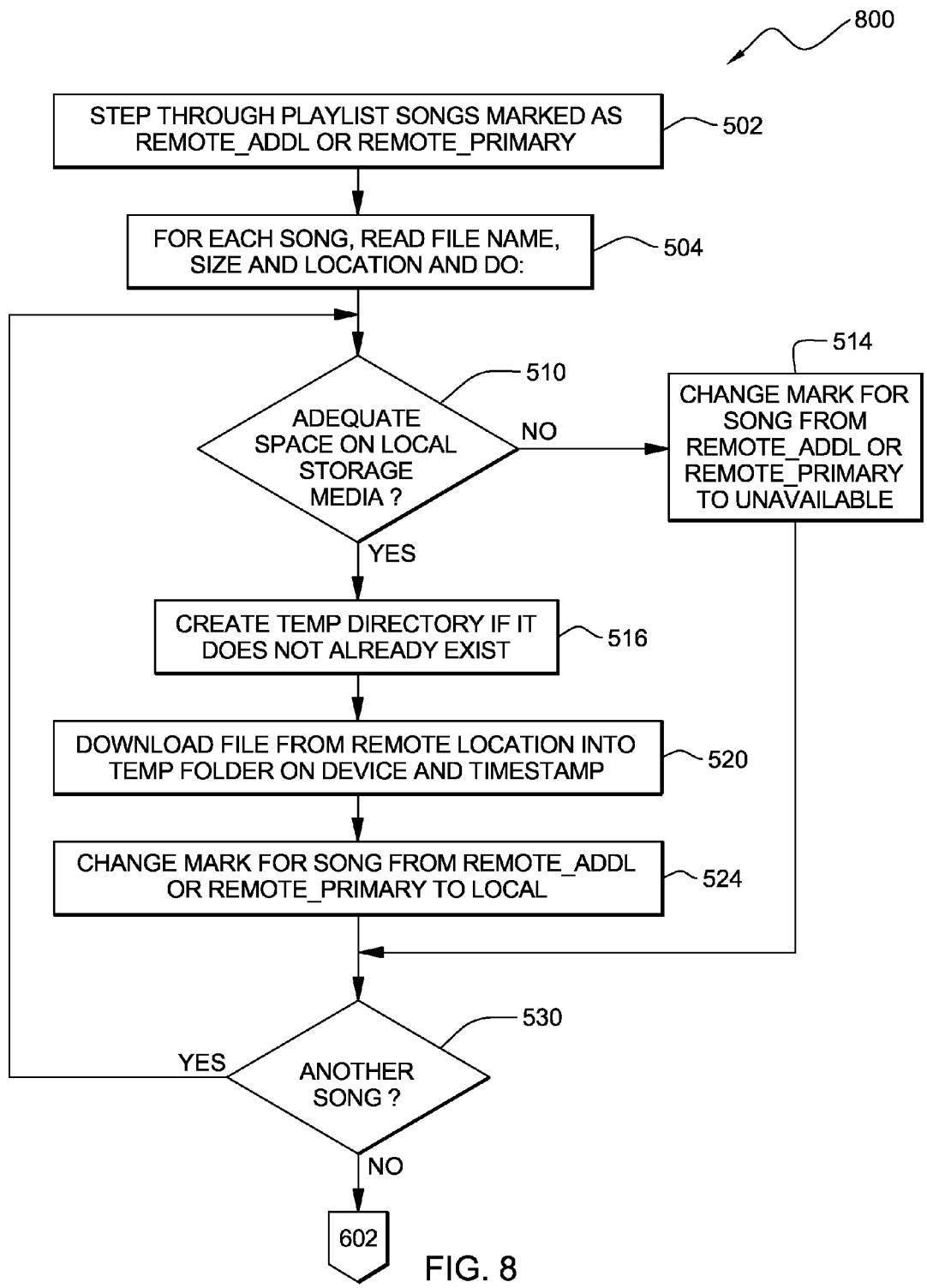

Turning to FIG. 8, reference numeral 800, the playlist synchronization tool in step 502 steps through the songs in the playlist that are marked as REMOTE_ADDL or REMOTE_PRIMARY. Further, in step 504, for each song to be obtained by the secondary device from either the primary device or an additional source, in step 502, the playlist synchronization tool reads the file name, the file size and location of the file and performs steps 510 through 530 for each of the songs in the playlist that are not available locally on the secondary device. In particular, the playlist synchronization tool on the secondary device determines in step 510 whether or not there is adequate space on the local storage media on the secondary device. If the playlist synchronization tool determines that the space on the local storage media on the secondary device is not adequate, then in step 514, the playlist synchronization tool changes the mark for the song from REMOTE_ADDL or REMOTE_PRIMARY to UNAVAILABLE, since the song cannot be stored on the secondary device, and the process continues with step 530. Further, in step 530, the playlist synchronization tool determines whether or not there is another song that the secondary device needs to obtain from either the primary device or an additional source. If the playlist synchronization tool determines that there is another song that the secondary device needs to obtain from either a primary device or an additional source, the playlist synchronization tool returns to step 510 and the steps 510 through 530 are repeated until no other song needs to be obtained by the secondary device and the process continues with step 602 in FIG. 9. On the other hand, in step 510, if the playlist synchronization tool determines that there is adequate space on the local storage media of the secondary device, then in step 516, the playlist synchronization tool creates a TEMP directory (temporary directory), if a temporary directory does not already exist. Further, in step 520, the playlist synchronization tool downloads the song file from the remote location into the TEMP directory on the secondary device and provides a timestamp for the song file downloaded and in step 524, the playlist synchronization tool changes the marking for the song file from REMOTE_ADDL or REMOTE_PRIMARY to LOCAL, since the song is now available on the secondary device itself. Further, in step 530, the playlist synchronization tool determines whether or not there is another song that the secondary device needs to obtain from either the primary device or an additional source. If the playlist synchronization tool determines that there is another song that the secondary device needs to obtain from either a primary device or an additional source, the playlist synchronization tool returns to step 510 and the steps 510 through 530 are repeated until no other song needs to be obtained by the secondary device and the process continues with step 602 in FIG. 9.

Figure 9:
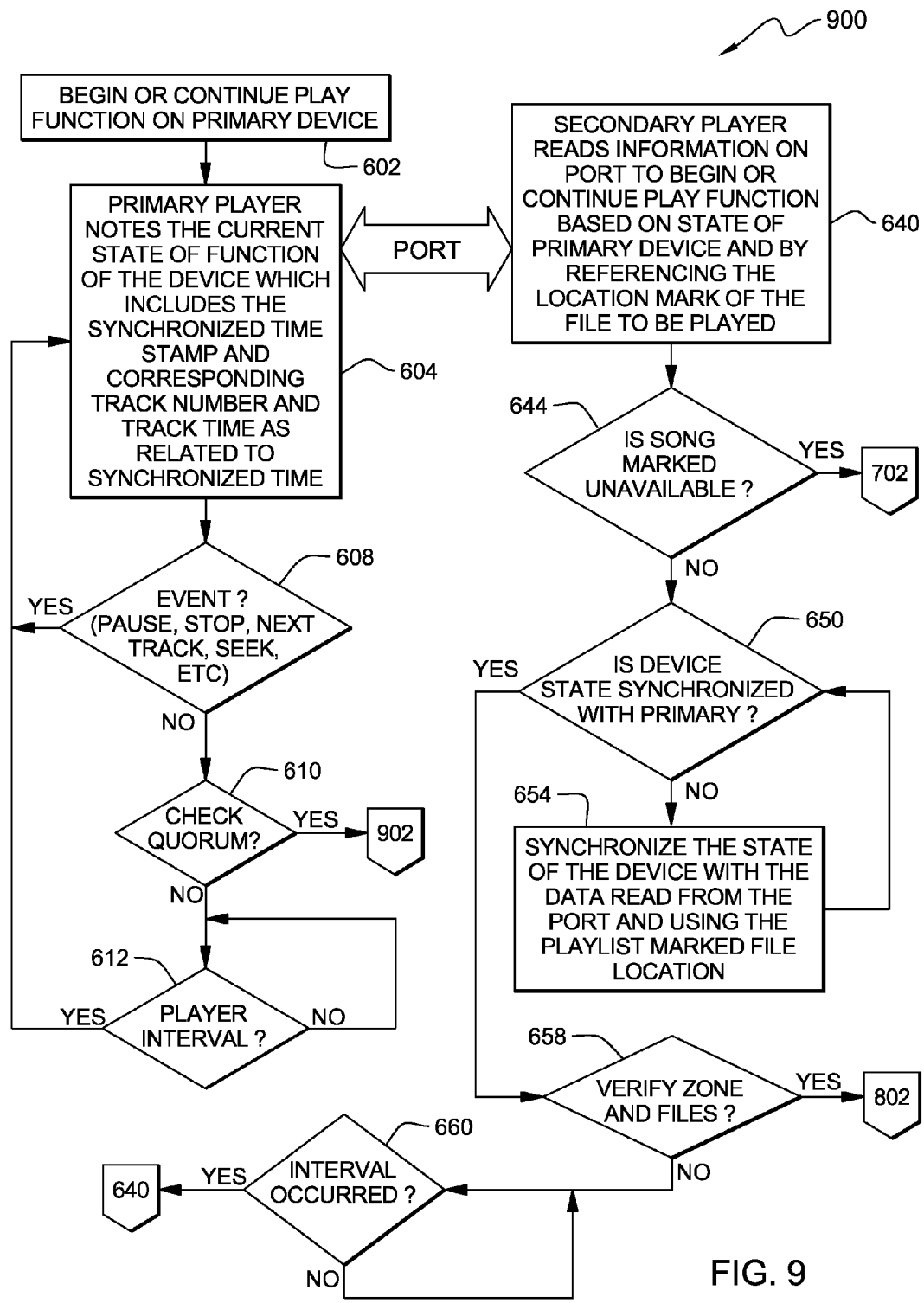

Turning to FIG. 9, reference numeral 900, the playlist synchronization tool on the primary device begins or continues in step 602 the PLAY function on the primary device. In step 604, the primary device notes the current state of function of the device, including the synchronized time stamp, the corresponding track number and the track time as related to synchronized time, which is communicated via a port to a secondary device. The primary device further determines in step 608 whether or not an event has occurred, such as pause, stop, next track or file, seek, etc. If any event has occurred, the primary device goes back to step 604 and the playlist synchronization tool notes the current state of the primary device and communicates the information to the secondary device via the port. If in step 608, an event has not occurred, then the playlist synchronization tool determines in step 610 whether or not to check quorum of devices that have a song in a playlist to be played. If the playlist synchronization tool determines to check quorum, then the process continues with step 902 in FIG. 12, discussed herein below. However, if the playlist synchronization tool determines not to check quorum, then the playlist synchronization tool determines in step 612 whether or not an interval has occurred on the primary player. If an interval has occurred on the primary device in step 612, then the playlist synchronization tool goes back to step 604 and the playlist synchronization tool notes the current state of the primary device and communicates the information to the secondary device via the port. Accordingly, in step 640, the secondary device reads the information on the port as to begin or continue the PLAY function based on the state of the primary device communicated to the secondary device and by referencing the location mark of the file to be played. The playlist synchronization tool on the secondary device determines in step 644 whether or not the song is marked UNAVAILABLE. If the song is marked UNAVAILABLE, then the process continues with step 702 in FIG. 10, discussed herein below. However if the song is not marked UNAVAILABLE, then the playlist synchronization tool determines in step 650 whether or not the secondary device is synchronized with the primary device. If the secondary device is not synchronized with the primary device, then in step 654 the playlist synchronization tool synchronizes the state of the secondary device with the data read from the port and using the playlist marked file location and repeats step 650 as necessary until the secondary device is synchronized with the primary device. When the playlist synchronization tool determines that the secondary device is synchronized with the primary device, the playlist synchronization tool determines in step 658 whether or not to verify zone and files. If the playlist synchronization tool determines to verify zone and files, then the process continues with step 802 in FIG. 11. However if the playlist synchronization tool determines not to verify zone and files, then the playlist synchronization tool determines in step 660 whether or not an interval has occurred. If an interval has not occurred, the playlist synchronization tool waits until an interval occurs in step 660. If an interval has occurred, the playlist synchronization tool goes back to step 640 and the process is repeated all over again.

Figure 10:
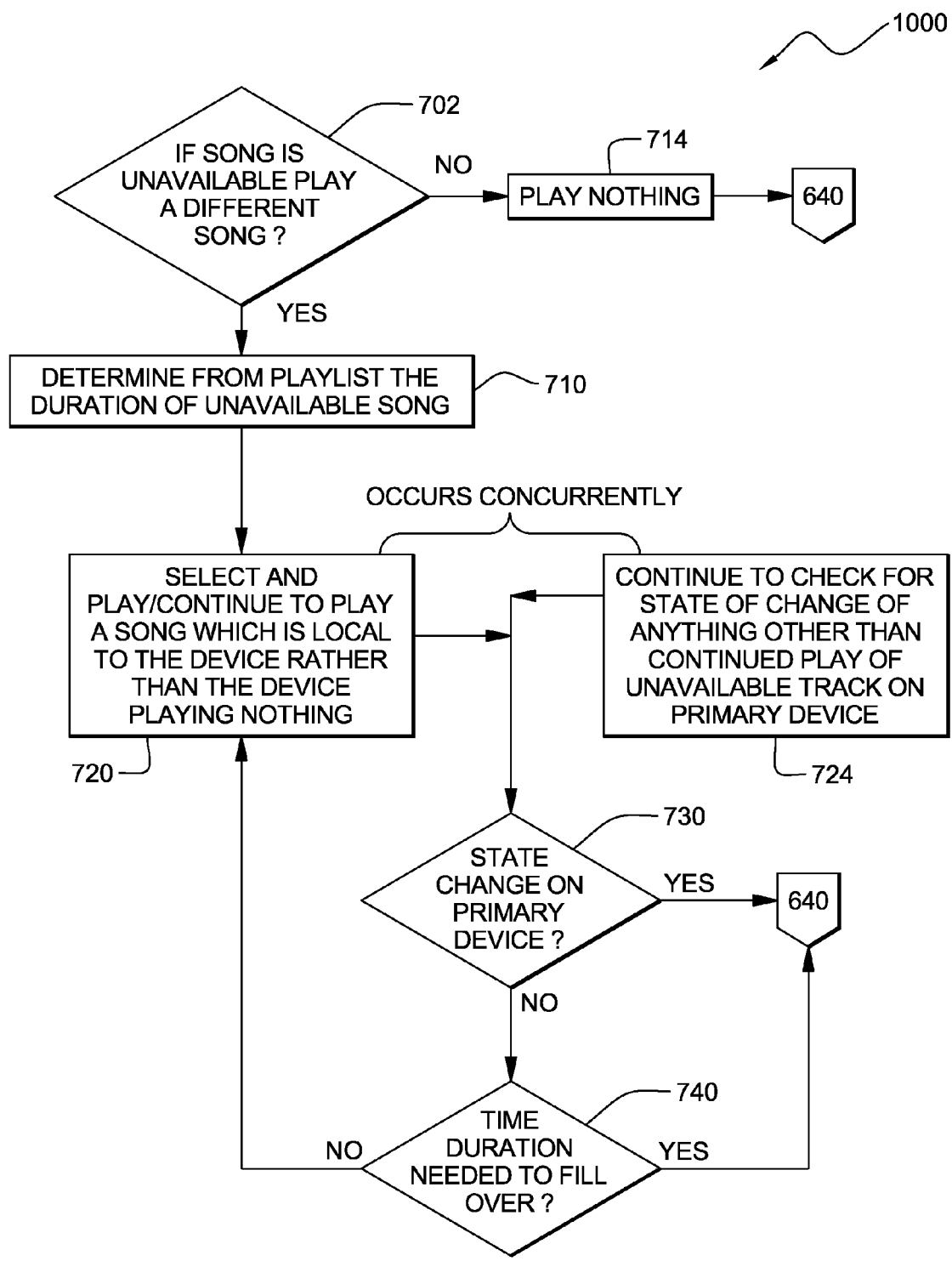

Referring to FIG. 10, reference numeral 1000, if a song is determined to be marked as UNAVAILABLE in step 644 of FIG. 9, then in step 702 of FIG. 10, the playlist synchronization tool determines in step 710 whether or not to play a different song having the same duration of the UNAVAILABLE TRACKL. If the playlist synchronization tool determines that the secondary device is not to play a different song, then in step 714, the secondary device plays nothing and the process goes back to step 640 in FIG. 9, as discussed herein above. On the other hand, if the playlist synchronization tool determines that the secondary device is to play a different song in step 702, then in step 710, the playlist synchronization tool determines from the playlist the duration of the UNAVAILABLE song. Further, in step 720, the playlist synchronization tool selects and plays or continues to play a song which is local to the secondary device rather than playing nothing. At the same time, in step 724, the playlist synchronization tool continues to check for state change of anything other than continued play of UNAVAILABLE track on the primary device. Further, the playlist synchronization tool determines in step 730 whether or not there has been any state change on the primary device. If there has not been a state change on the primary device, the playlist synchronization tool determines in step 740 whether or not the time duration needed to fill the UNAVAILABLE song is over. If the time duration is not over, then the process goes back to steps 720 and 724. However, if there has been a state change on the primary device in step 730 or if the time duration needed to fill is over in step 740, then the process goes back to step 640 of FIG. 9, discussed herein above.

Figure 11:
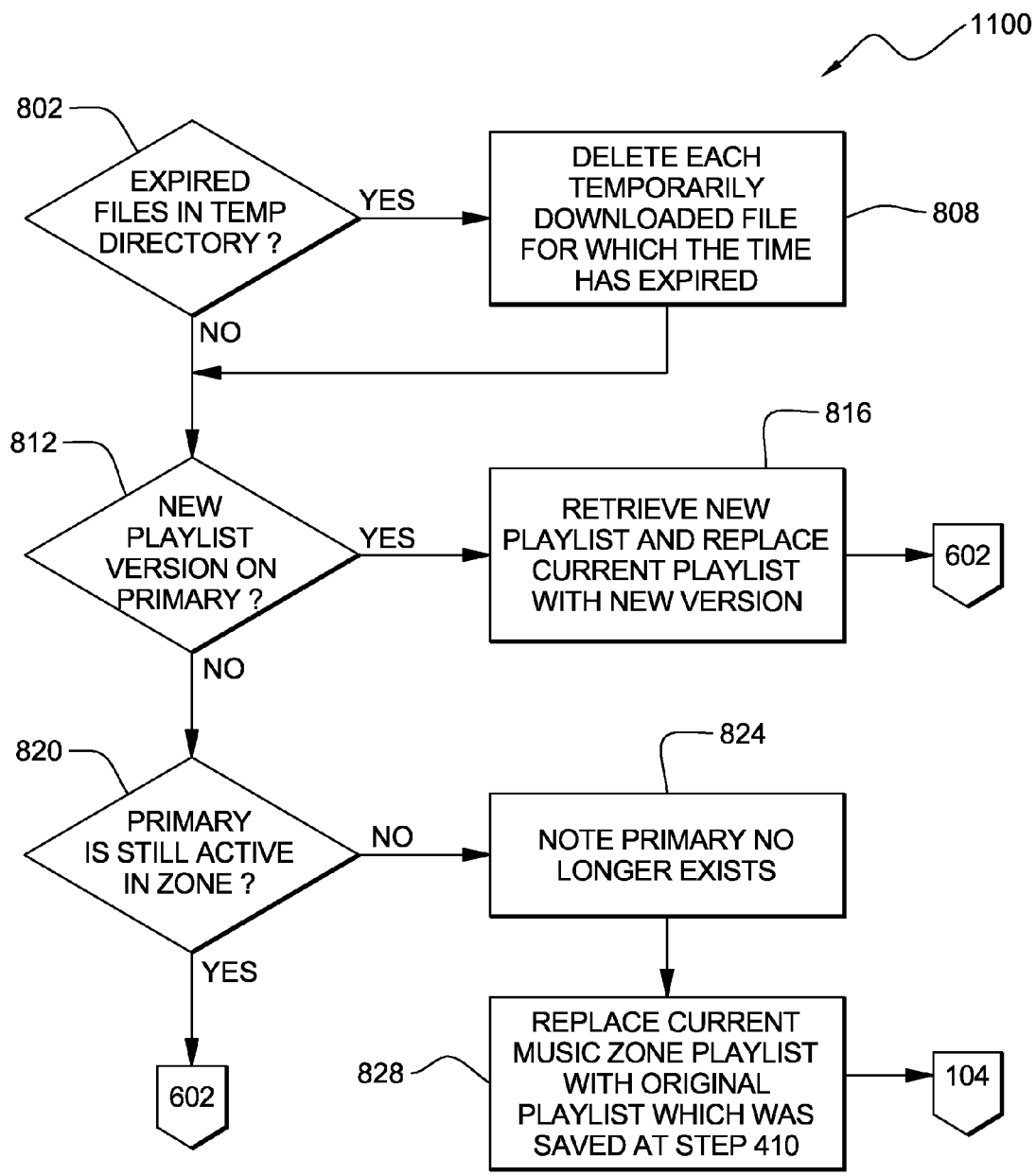

Referring back to FIG. 9, step 658, if the playlist synchronization tool determines to verify the zone and files, then the process continues with step 802 in FIG. 11. Turning to FIG. 11, reference numeral 1100, the playlist synchronization tool determines in step 802 whether or not there are expired files in TEMP directory. If there are expired files in the TEMP directory, then in step 808, the playlist synchronization tool deletes each temporarily downloaded file for which the time has expired and the process continues with step 812. Similarly, if there are no expired files in the TEMP directory in step 802, then in step 812, the playlist synchronization tool determines whether or not there is a new playlist on the primary device. If there is a new playlist on the primary device, then the playlist synchronization tool retrieves in step 816 the new playlist and replaces the current playlist with the new version and returns to step 602 in FIG. 9, as discussed herein above. However, if there is no new playlist version in step 812, then in step 820 the playlist synchronization tool determines whether or not the primary device is still active in the zone or location. If the primary device is still active in the zone, then the process goes back to step 602 in FIG. 9, as discussed herein above. However, if the primary device is determined not to be active in the zone, then in step 824, the playlist synchronization tool notes that the primary device no longer exists and, in step 828, the playlist synchronization tool replaces the current music zone playlist with the original playlist that was saved in step 410 of FIG. 6 and the process continues with step 104 of FIG. 1, discussed herein above.

Figure 12:
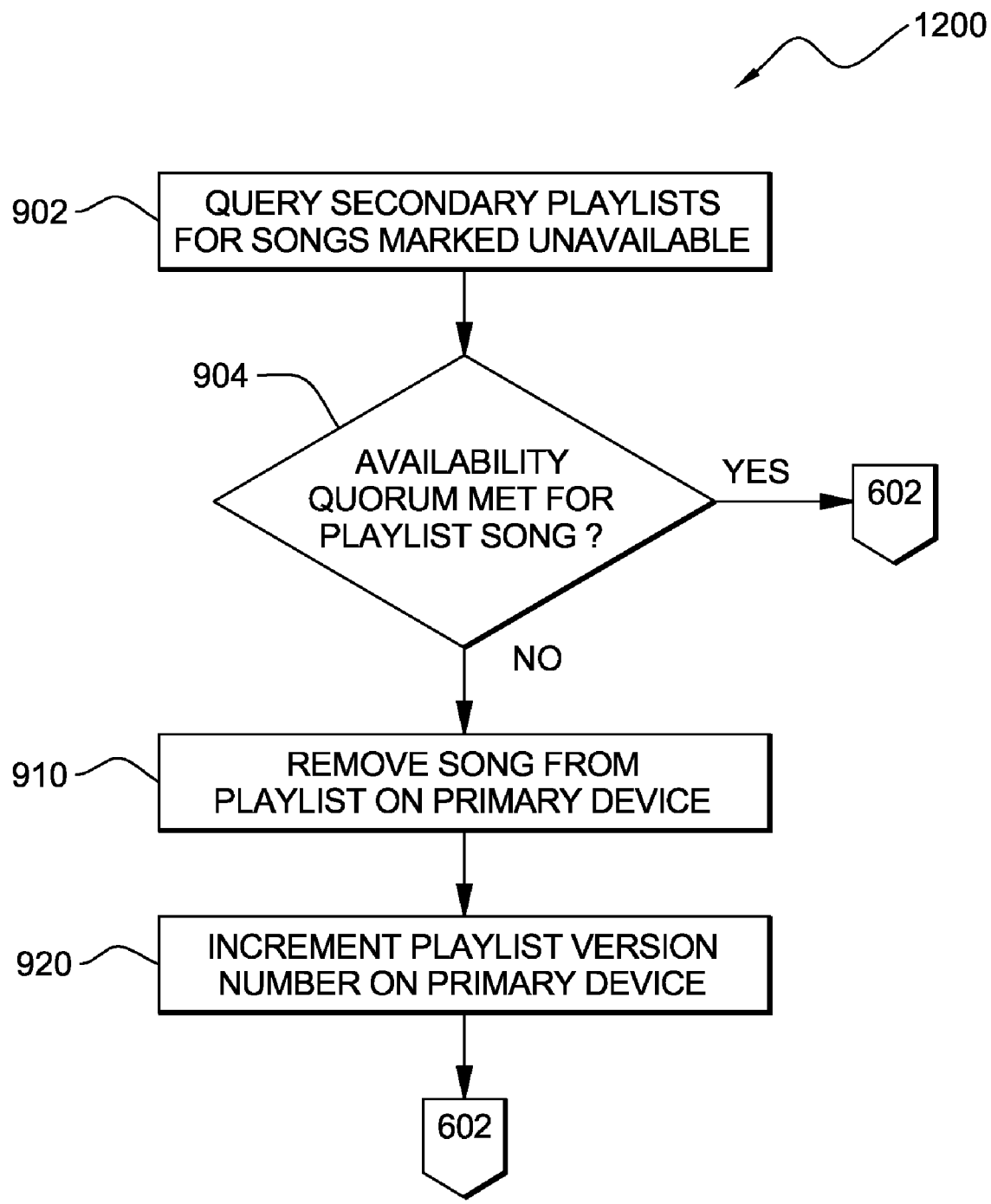
FIG. 12 is a schematic block system diagram illustrating an embodiment of a system that includes a plurality of audio playback devices connected via a network communications channel for synchronizing playing of an ordered list of auditory content on the audio playback devices in multiple locations, in accordance with an embodiment of the present invention.

Referring back to FIG. 9, step 610, if the playlist synchronization tool determines to check quorum, then the process continues with step 902 in FIG. 12. Turning to FIG. 12, reference numeral 1200, the playlist synchronization tool in step 902 queries the playlists on the secondary device for songs marked UNAVAILABLE. Further, in step 904, the playlist synchronization tool determines whether or not the availability quorum is met for a song in the playlist to be played in synchronization. If the availability quorum is met in step 904, then the process continues with step 602 in FIG. 9. However, if the availability quorum is not met in step 904, then in step 910, the playlist synchronization tool removes the song from the playlist on the primary device and the playlist synchronization tool increments in step 920 the playlist version number on the primary device, and the process repeats with step 602 in FIG. 9, discussed herein above.

Figure 13:
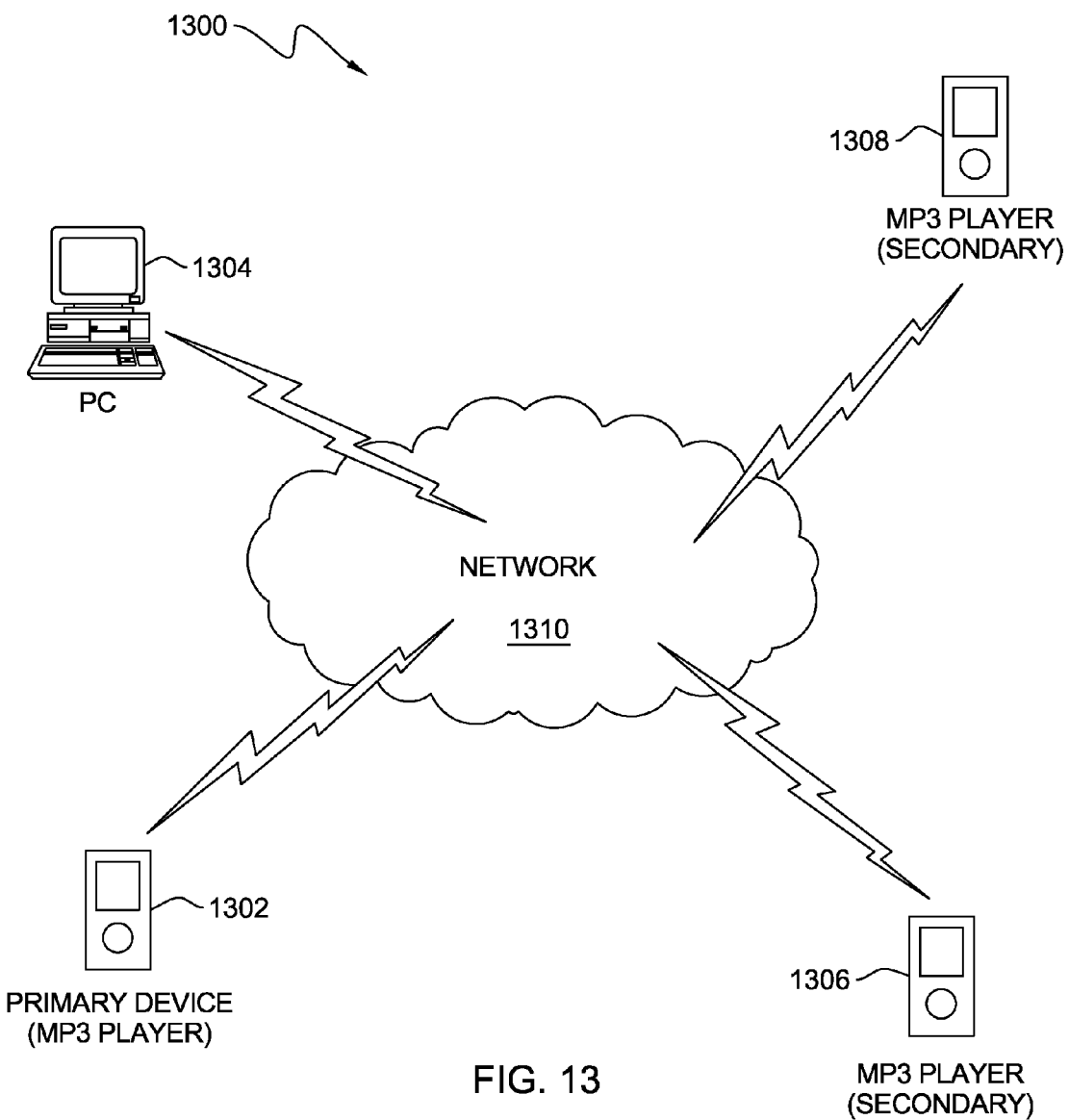
FIG. 13 is a schematic block system diagram illustrating an embodiment of a wireless playback device for synchronizing playing of an ordered list of auditory content on one or more audio playback devices in multiple locations, in accordance with an embodiment of the present invention.

In another embodiment, the invention provides a system for synchronizing playing of an audio playlist on one or more audio playback devices in multiple locations, in accordance with an embodiment of the present invention. Turning to FIG. 13, reference numeral 1300 depicts a system for synchronizing playing of an audio playlist on one or more audio playback devices in multiple locations. In particular, the system 1300 comprises of a network 1310 that provides a communications channel for multiple devices. As shown in the embodiment in FIG. 13, a primary device or MP3 player 1302 is connected to the network. An embodiment of an MP3 player is shown and discussed herein below with respect to FIG. 14. Further, secondary devices, such as, MP3 player 1306 and MP3 player 1308 are connected to the network 1310. Further yet, the system 1300 includes a personal computer (PC) 1304 that is connected to the network. In an embodiment, the PC contains an attached storage or hard drive that stores a digital music library or collection on the hard drive. The playlist synchronization tool or software that provides the synchronization functionality is installed on each of the MP3 players and the PC.

Figure 14:
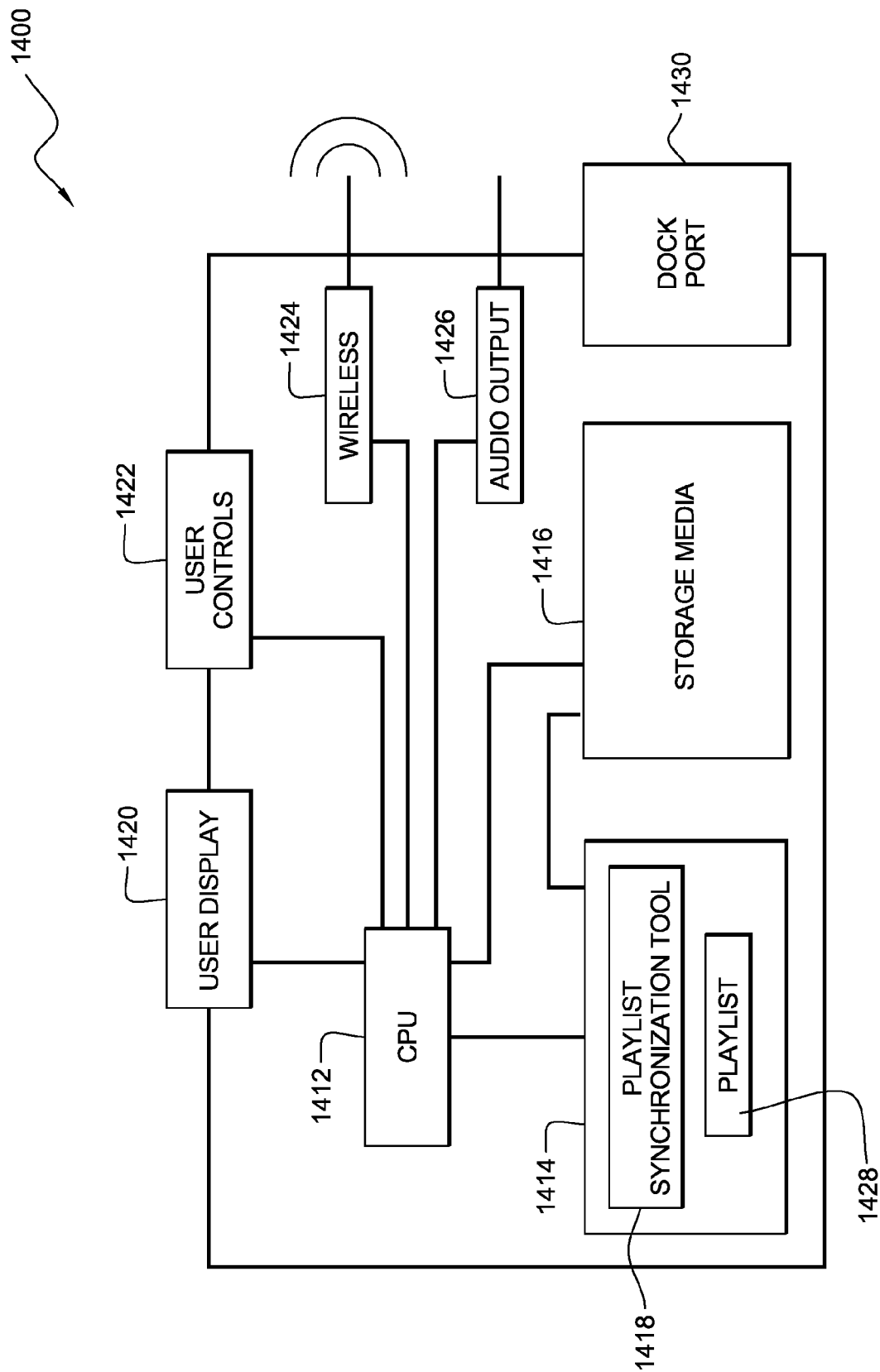
FIG. 14 is a schematic block system diagram illustrating an embodiment of a computer system having deployed thereon a playlist synchronization tool or code for synchronizing playing of an ordered list of auditory content on one or more audio playback devices in multiple locations, in accordance with an embodiment of the present invention.

Turning to FIG. 14, reference numeral 1400, depicts an embodiment of an MP3 player (MPEG-1 (Moving Pictures Experts Group), Audio Layer 3 player) for synchronizing playing of files in an audio playlist. The MP3 player 1400 includes a CPU (Central Processing Unit) 1412, a user display 1420, user controls or interfaces 1422, a wireless modem 1424, an audio output 1426, a storage media 1416, a memory 1414 that contains a playlist synchronization tool 1418 and a playlist 1428 and a dock port 1430. The CPU 1412 is configured generally to execute operations within the MP3 player 1400, such as, the playlist synchronization tool or code 1414. The user display 1420 displays the menu options for a user. The user controls or interfaces 1422 receive input from the user. The wireless modem 1424 allows the MP3 player to communicate wirelessly with the other devices connected to the network. The audio output 1426 provides audio for the MP3 player. A dock port 1430 enables the MP3 player to be connected to other external devices, thus, extending the audio range of the MP3 player. Further, the storage media 1416 provides storage for the MP3 player. The memory 1414 stores the playlist synchronization tool or code 1418 and also stores the audio files or playlist 1428.

Figure 15:
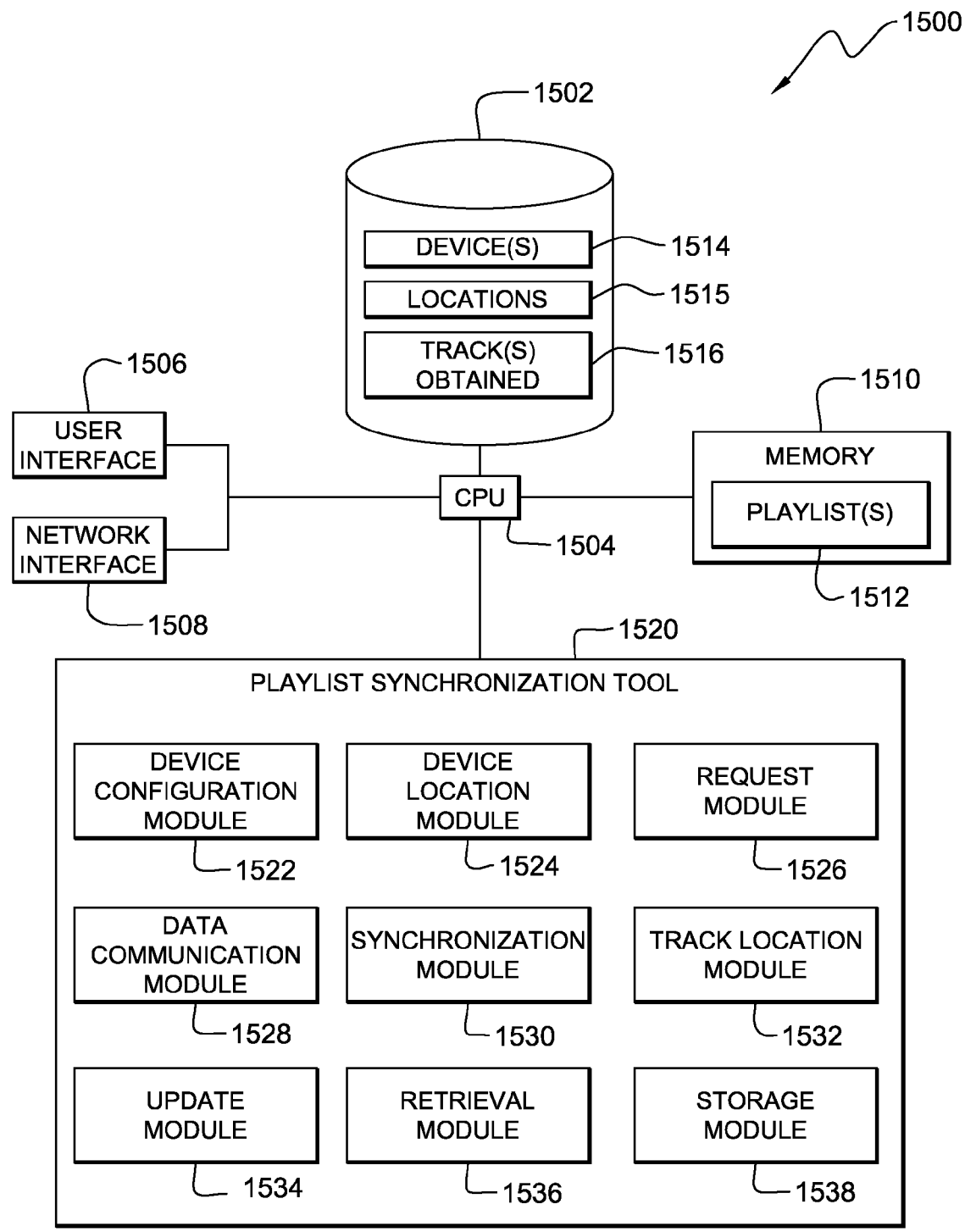
FIG. 15 depicts a schematic block system diagram illustrating one embodiment of a personal computer or server that has deployed thereon a playlist synchronization tool or code according to the present invention.

Reference is now made to FIG. 15, reference numeral 1500, which depicts a schematic block system diagram illustrating one embodiment of a computer system 1500, such as, a standalone or personal computer or server that has deployed thereon a playlist synchronization tool or code 1520 that is configured to synchronize playing of files in an audio playlist on one or more audio playback devices, such as, an MP3 player (MPEG-1 (Moving Pictures Experts Group), Audio Layer 3 player) with a speaker dock or a personal computer that has stored on its hard drive a MP3 music collection, where the audio playback devices are located in multiple locations. As shown in FIG. 15, the server or system 1500 comprises a central processing unit (CPU) 1504, a local storage device 1502, a user interface 1506, a network interface 1508 and a memory 1510. The CPU 1504 is configured generally to execute operations within the system 1500, such as, the playlist synchronization tool or code 1520. The user interface 1506 is configured, in one embodiment, to receive input from a user. The network interface 1508 is configured, in one embodiment, to facilitate network communications of the system 1500 over a communications channel of a network. In one embodiment, as shown in FIG. 15, the playlist synchronization tool 1520 comprises a logic unit that contains a plurality of modules configured to functionally execute the necessary steps of synchronizing playing of an audio playlist on one or more audio playback devices located in multiple locations, such that, each audio playback device plays the same track or song or file from the audio playlist at the same time. In particular, the playlist synchronization tool or code 1520 comprises a device configuration module 1522, a device location module 1524, a request module 1526, a data communication module 1528, a synchronization module 1530, a track location module 1532, an update module 1534, a retrieval module 1536 and a storage module 1538.

Referring to FIG. 15, the device configuration module 1522 of the playlist synchronization tool 1520 configures each audio playback device connected to a network and located in different locations, such that, each audio playback device plays the same track on a playlist at the same time and in synchronization. Further, in an embodiment, the device configuration module 1522 configures one of the audio playback devices to be a primary device that will set the pace for the other audio playback devices (secondary devices), such that, each secondary audio playback device plays the same track or file in the playlist at the same time in synchronization with the primary device. In an embodiment, the device configuration module 1522 stores the device configuration information (reference numeral 1514) in a storage system, such as, database 1502. The device location module 1524 tracks the location or zone of each audio playback device and, in particular, determines whether there is a primary device in a music zone or location that is already active. In an embodiment, the device location module stores the location information (reference numeral 1515) in a storage system, such as, database 1502. The request module 1526 sends a request from a secondary device to the primary device requesting authorization to join the active music zone or location list for playing a track or file in an audio playlist in synchronization with the primary device. The data communication module 1528 communicates the location or zone file information from the primary device to each of the secondary devices that the playlist synchronization tool authorizes to play the audio playlist in synchronization with the primary device. Further, the data communication module 1528 communicates the audio playlist file information from the primary device to each secondary device that is to play the audio playlist in synchronization with the primary device. In an embodiment, the data communication module 1528 stores the one or more audio playlists (reference numeral 1512) to be played in synchronization with the primary device in a local memory 1510. Furthermore, the data communication module 1528 communicates data pertaining to a current state of the primary device, which contains data, such as, a synchronized time stamp, a track number of the track on a playlist to be played and a track time referencing a point-in-time mark of the track where each secondary device is to begin playing the track. The synchronization module 1530 monitors the current state of the primary device and communicates the current state of the primary device to each of the audio playback devices, such that, each secondary device plays the same track or file at the same time in synchronization with the primary device. The track location module 1532 determines whether or not a track or file to be played next on the audio playlist is located locally on an audio playback device, such that, the audio playback device is prepared to play the next track or file in synchronization with the primary device. The update module 1534 updates the current state of the primary device, so that the current up-to-date state information can be communicated to each of the secondary devices for playing the audio playlist in synchronization with the primary device. The retrieval module 1536 retrieves a track or a file from another audio playback device or the primary device or from a device external to the network for playing the track or file in synchronization with the primary device. The storage module 1538 stores a track or file that is retrieved from another audio playback device or the primary device or from a device external to the network in a temporary file for playing the track or file in synchronization with the primary device. In an embodiment, the storage module 1538 stores the tracks or files retrieved or obtained (reference numeral 1516) for an audio playback device in a storage system, such as, database 1502.

For example, Bob owns 2 Wi-Fi (Wireless Fidelity) MP3 players, referred to as Player-1 and Player-2, each with a speaker dock, and a personal computer (PC), referred to as PC, which stores Bob's MP3 music collection on the hard drive. There is a home network, and the Wi-Fi MP3 players and the PC are attached via a wireless connection (although the connection may also be wired) and can communicate with each other on the network. The playlist synchronization tool or software that provides the synchronization functionality is installed on both Player-1 and Player-2 and the PC. The network and PC are on and functioning correctly. Bob turns on Player-1 which is attached to a speaker dock located in the family room. He has previously configured the playlist synchronization software to start automatically by default and it does so. Player-1 broadcasts a query over the network to determine whether there is a primary device and a music or music zone already active. There are no other zones within the network range that are currently active and Bob is prompted on the display of Player-1 to "Press the Select Button to Create a New Zone". Bob presses the select button and Player-1 reads the audio zone name (Bobs_Music_Zone) that Bob has pre-defined the device (Player-1) to use when creating a new zone. Alternatively, if Bob has not pre-defined a name that the device should use when creating a new audio zone, the device may assign a default name to the audio zone, for instance, using the serial number of the device, etc. Assuming that Bob has pre-defined the name, Player-1 sets the zone or location name variable to Bobs_Music_Zone and creates a configuration file on the device named Bobs_Music_Zone.zoneinfo. Player-1 adds an entry to Bobs_Music_Zone.zoneinfo identifying itself as the PRIMARY_DEVICE. Player-1 then reads the existing playlist and copies it to create the zone playlist Bobs_Music_Zone.playlist. Bob has pre-configured Player-1 to not act as a fileserver or allow it to serve streams since the PC will be providing that function, as needed. Player-1 adds the additional music source of the PC, to Bobs_Music_Zone.zoneinfo and downloads a copy of the playlist available from the PC to create Bobs_Music_Zone.additional_playlist. At this point the music or audio zone Bobs_Music_Zone is created. Bob presses PLAY on Player-1 and the MP3 player operates as normal. Bob turns on Player-2 which is attached to a speaker dock and located in the kitchen. Bob manually activates the playlist synchronization software on Player-2 and the device queries the network for an active zone. Player-2 discovers the primary device of Player-1 and the music or audio zone Bobs_Music_Zone. Player-2 displays the options to join the existing zone or to create a new zone. Bob selects to join the existing zone and Player-2 sends a "request-to-join" message to Player-1. Player-2 also starts a timer in order to time-out and resume normal operations in the event there is a failure to join the zone. Player-1 receives a "request-to-join" message from Player-2 and given that Bob has no pre-defined rules created on Player-1 about allowing or denying devices to join, allows the join request by adding Player-2 to the file Bobs_Music_Zone.zoneinfo and then sends the files Bobs_Music_Zone.zoneinfo, Bobs_Music_Zone.playlist, and Bobs_Music_Zone.additional-playlist to Player-2. Player-2 receives the zone files and creates a persistent communications port session to Player-1. Player-2 synchronizes time with Player-1, saves the current playlist and replaces the playlist with Bobs_Music_Zone.playlist. Player-2 examines the playlist in order to find the song locations for the music to be played. For example, if the playlist contains 3 songs (song-1, song-2, song-3) which are located at the following physical locations:

song-1 file is located on Player-1 and Player-2
    song-2 file is located on Player-1 and on the PC
    song-3 file is located on Player-1 only As Player-2 steps through the playlist, it determines that song-1 is located on its own storage media and updates the playlist location database entry to reflect the song location availability as LOCAL. Player-2 determines that the next song in the playlist, song-2, is not located locally on Player-2 but is available remotely from the PC as listed on Bobs_Music_Zone.additional_playlist. The playlist location database entry is updated on Player-2 to reflect the song location availability as REMOTE_ADDL. Player-2 determines the next song on the list, song-3, is located only on Player-1 and because Player-1 does not allowing streaming or downloading, Player-2 marks the playlist location database entry to reflect the track as UNAVAILABLE. After the playlist database has been updated to include the file location information, Player-2 checks the file sizes for all songs marked as REMOTE (in this case, only song-2 is remote) and can determine that there is ample storage locally to temporarily save the file. Player-2 begins to download the track to a TEMP directory. In an embodiment, this operation takes place in the background so that Player-2 can continue with other functions. Once the track has been downloaded, Player-2 updates the playlist location database entry to reflect the song location availability as LOCAL. When Bob presses PLAY on Player-2, Player-2 checks the state data given on the port by Player-1. At a synchronized time of 17:05:05, Player-1 is currently playing and is 1:15 into song-1. Player-2 begins playing song-1 at the point relative to the synchronized time where the point of time in the song is synchronized with that on Player-1. For instance, Player-2 begins playing song-1 at 17:05:06 at the time point 1:16. The time synchronization ideally would extend to tenths and hundredths of seconds for precision. In order to maintain synchronicity, Player-1 updates its state information and Player-2 examines the state information, making adjustments if needed, at regular intervals. Pressing pause on Player-1 creates an update to the state as listed on the communications port and Player-2 will likewise PAUSE play until the state information changes. At intervals, Player-2 performs clean-up of the TEMP directory by deleting files which were downloaded only to provide synchronized play and which are not to be retained on the device. Player-2 also checks if the playlist has changed on Player-1 and downloads a new copy as needed as well as determining if Player-1 is still active. When Player-1 is turned off or the synchronization feature is turned off, the synchronized music or audio zone ceases to exist and Player-2 resumes function as a non-synchronized device.

In the above example, the zoneinfo file having a zone name set to Bobs_Music_Zone (Bobs_Music_Zone.zoneinfo) would contain the following:
ZONE_NAME=Bobs_Music_Zone (User configured or device generated zone name)
PRIMARY_DEVICE=Player-1 (MP3 device which created initial zone)
ADDITIONAL_SOURCE=PC (Additional source for MP3 files)
PRIMARY_FILESERVE=NO (Primary Device allows players to download content)
PRIMARY_FILESTREAM=NO (Primary Device stream content to players)
PLAYER=Player-2 (Player which has joined and updated zoneinfo file)

Further, in the above example, the playlist file having a zone name set to Bobs_Music_Zone is Bobs_Music_Zone.playlist. Accordingly, modifications required to the playlist include the required association of a song file with the physical location of the song. As such, a correlation between the location and the original playlist information is all that is required and can be accomplished by glue-code of the existing playlist and a database to include location and by imposing this invention's updated playlist on top of an existing structure or by other means not noted here.

Accordingly, the invention provides a system and method for creating, updating, and synchronizing a playlist among multiple wireless and/or network attached or otherwise capable music playback devices for the purpose of creating a synchronized and continuous audible content stream to be played back on all participating devices. The invention provides a method by which all devices capable of communicating on a wired or wireless network may participate, thereby extend the listening range of the original music or voice content. By passing control information to the participating devices, the synchronization method ensures that the devices are playing the same track at the same time. Further, in an embodiment, since the audio tracks are located wholly and individually on each participating device, this eliminates the overhead of streaming files over a network and any related problems that may occur, such as, bandwidth saturation, buffering hang-ups, dropouts, etc. However, if a participating device does not have a track on the synchronized playlist stored locally, the invention describes a method of temporarily pre-downloading the upcoming track, if needed, playing the track locally and in synchronization with all other participating players and then deleting the downloaded track.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of synchronizing play of first and second auditory files on first and second secondary audio playback devices and a primary audio playback device, the first and second auditory files being stored on both the first and second audio playback devices, the method comprising the steps of:

the primary audio playback device receiving requests from both the first and second audio playback devices to play auditory files in synchronization with the primary audio playback device, and in response, the primary audio playback device registering both the first and second audio playback devices to play auditory files in synchronization with the primary audio playback device;

based in part on the registrations of the first and second audio playback devices, the primary audio playback device sending a play list, listing the first and second auditory files, to the first and second audio playback devices to enable the first and second audio playback devices to acquire the first and second auditory files if not already stored on the first and second audio playback devices; and subsequent to the storing of the first and second auditory files on both the first and second audio playback devices and the sending of the play list to the first and second audio playback devices, the primary audio playback device determining that both the first and second audio playback devices are registered to play auditory files in synchronization with the primary audio playback device, and the primary audio playback device communicating to the first and second audio playback devices, at approximately the same time, a command to begin play of the first auditory file stored on the first and second audio playback devices such that the first and second audio playback devices play the first auditory file substantially in synchronization with each other and the primary audio playback device, and after play of the first auditory file, the primary device communicating to the first and second audio play devices, at approximately the same time, another command to begin play of the second auditory file stored on the first and second audio playback devices such that the first and second audio playback devices play the second auditory file substantially in synchronization with each other and the primary audio playback device; and wherein the play list also lists a third auditory file which is stored on the second audio playback device but not on the first audio playback device; and the primary playback device receives from the first audio playback device a request to remove the third auditory file from the play list, and in response, the primary audio playback device deletes the third auditory file from the play list and does not command either the first or second audio playback device to play the third auditory file.

2. A computer program product for synchronizing play of first and second auditory files on first and second secondary audio playback devices and a primary audio playback device, the first and second auditory files being stored on both the first and second audio playback devices, the computer program product comprising:

one or more computer-readable tangible storage devices and program instructions stored on at least one of the one or more storage devices, the program instructions comprising:

program instructions, for execution on the primary audio playback device, to receive requests from both the first and second audio playback devices to play auditory files in synchronization with the primary audio playback device, and in response, to register both the first and second audio playback devices to play auditory files in synchronization with the primary audio playback device;

program instructions, for execution on the primary audio playback device, based in part on the registrations of the first and second audio playback devices, to send a play list, listing the first and second auditory files, to the first and second audio playback devices to enable the first and second audio playback devices to acquire the first and second auditory files if not already stored on the first and second audio playback devices; and program instructions, for execution on the primary audio playback device, operative subsequent to the storing of the first and second auditory files on both the first and second audio playback devices and the sending of the play list to the first and second audio playback devices, to determine that both the first and second audio playback devices are registered to play auditory files in synchronization with the primary audio playback device, and communicate to the first and second audio playback devices, at approximately the same time, a command to begin play of the first auditory file stored on the first and second audio playback devices such that the first and second audio playback devices play the first auditory file substantially in synchronization with each other and the primary audio playback device, and after play of the first auditory file, to communicate to the first and second audio play devices, at approximately the same time, another command to begin play of the second auditory file stored on the first and second audio playback devices such that the first and second audio playback devices play the second auditory file substantially in synchronization with each other and the primary audio playback device; and wherein the play list also lists a third auditory file which is stored on the second audio playback device but not on the first audio playback device; and program instructions, instructions, stored on at least one of the one or more storage devices for execution on the primary playback device, to receive from the first audio playback device a request to remove the third auditory file from the play list, and in response, delete the third auditory file from the play list such that the primary playback device does not command either the first or second audio playback devices to play the third auditory file.

3. A computer system product for synchronizing play of first and second auditory files on first and second secondary audio playback devices and a primary audio playback device, the first and second auditory files being stored on both the first and second audio playback devices, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions, for execution on the primary audio playback device, to receive requests from both the first and second audio playback devices to play auditory files in synchronization with the primary audio playback device, and in response, to register both the first and second audio playback devices to play auditory files in synchronization with the primary audio playback device;

program instructions, for execution on the primary audio playback device, based in part on the registrations of the first and second audio playback devices, to send a play list, listing the first and second auditory files, to the first and second audio playback devices to enable the first and second audio playback devices to acquire the first and second auditory files if not already stored on the first and second audio playback devices; and program instructions, for execution on the primary audio playback device, operative subsequent to the storing of the first and second auditory files on both the first and second audio playback devices and the sending of the play list to the first and second audio playback devices, to determine that both the first and second audio playback devices are registered to play auditory files in synchronization with the primary audio playback device, and communicate to the first and second audio playback devices, at approximately the same time, a command to begin play of the first auditory file stored on the first and second audio playback devices such that the first and second audio playback devices play the first auditory file substantially in synchronization with each other and the primary audio playback device, and after play of the first auditory file, to communicate to the first and second audio play devices, at approximately the same time, another command to begin play of the second auditory file stored on the first and second audio playback devices such that the first and second audio playback devices play the second auditory file substantially in synchronization with each other and the primary audio playback device; wherein the play list also lists a third auditory file which is stored on the second audio playback device but not on the first audio playback device; and program instructions, stored on at least one of the one or more storage devices for execution on the primary playback device, to receive from the first audio playback device a request to remove the third auditory file from the play list, and in response, delete the third auditory file from the play list such that the primary playback device does not command either the first or second audio playback devices to play the third auditory file.

* * * * *